UNITED STATES PATENT OFFICE.

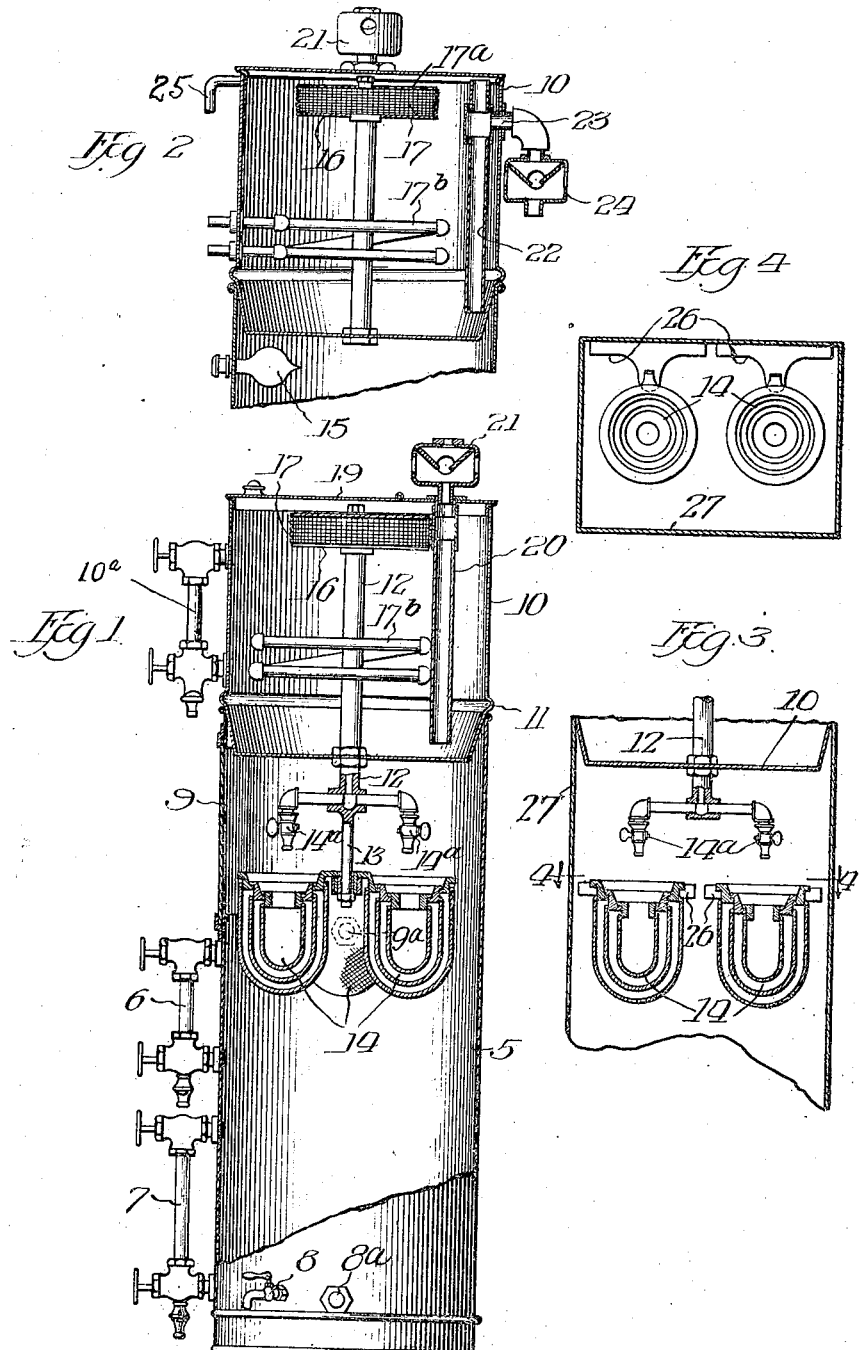

WILLIAM WASHBURN NUGENT, OF CHICAGO, ILLINOIS.

COMBINED FILTER AND WATER-SEPARATOR.

1,252,017.  Specification of Letters Patent.  Patented Jan. 1, 1918.

Application filed March 4, 1914. Serial No. 822,251.

*To all whom it may concern:*

Be it known that I, WILLIAM WASHBURN NUGENT, a citizen of the United States, residing at Chicago, in the county of Cook and State of Illinois, have invented certain new and useful Improvements in Combined Filters and Water-Separators, of which the following is a specification.

This invention relates to an apparatus for removing impurities from oil and also for separating water from oil, and the principal object of the invention is to provide a device of this kind which is accessible and simple in construction and effective, efficient and automatic in operation.

For the attainment of these ends and the accomplishment of other new and useful objects, as will appear, the invention consists in the features of novelty in the construction, combination and arrangement of the several parts generally shown in the accompanying drawing and described in the specification, but more particularly pointed out in the appended claim.

In the drawings, Figure 1 is a sectional elevation of an apparatus constructed in accordance with the principles of my invention.

Fig. 2 is a sectional elevation of a part of the apparatus showing the automatic water separator and overflow.

Fig. 3 is a detail sectional elevation of a modified form of support, and

Fig. 4 is a cross-section on the line 4—4 of Fig. 3.

This apparatus comprises an upright receptacle 5 closed at the bottom and open at the top with gages 6 and 7 to indicate the height of liquid therein, a draw-off cock 8 and an outlet $8^a$ at the bottom and an overflow $9^a$ below the bottom of the door 9. Adjacent the top of the receptacle it is provided with a door 9 through which access may be had to the upper part of the receptacle, and an electric lamp 15 is inserted in the receptacle 5 to aid inspection.

Supported in the upper end of the receptacle 5 is a separator receptacle 10 formed adjacent the bottom with a ridge or projection 11 which engages the top edge of the receptacle 5 and holds the separator receptacle firmly in position. Connected to the separator receptacle 10 through the bottom thereof is an upright tubular member 12 which extends below the bottom of the separator receptacle and forms a support 13 for a plurality of filter elements comprising a plurality of groups of removable and interchangeable filter members 14 mounted on rings and bodily removable with them, each group consisting of filters of different fineness of mesh and arranged one within the other so that if fluid from the innermost filter member overflows or passes through the innermost member it will then pass through the next outer member. Disposed above the groups of filter members and connected with the tubular member 12 are outlet cocks $14^a$ by means of which the fluid to be filtered is discharged into the innermost filter members. These filter members and the cocks $14^a$ are readily manipulated and the filters removed for cleaning through the door 9 in the upper part of receptacle 5.

To the tip of the tubular member 12 is secured a base plate 16 considerably larger in diameter than the member 12, and extending upward from the edge thereof is a screen 17 through which the liquid to be filtered passes, the screen being covered on top with a plate $17^a$. Surrounding the tubular member 12 in the receptacle 10 is a steam-coil $17^b$. The receptacle 10 is provided with a hinged lid 19 through which access may be had to the interior and a gage glass $10^a$ communicates with the receptacle below the base plate 16.

An inlet tube 20 is also connected to the receptacle 10 through the top thereof and extends to a point near the bottom of the receptacle. An air extractor and sight-feed 21 is located outside of the receptacle in communication with the tube 20 and constitutes means for eliminating the air and observing the amount of liquid passing into the filter. The separator receptacle may be fed through this sight-feed from an oil return system of any well known kind.

An automatic overflow is provided in connection with the receptacle 10 which comprises a tubular member 22 extending from a point adjacent the bottom of the receptacle to the top thereof and above the upper edge of the screen 17. Connected to the tubular member 22 and extending to the side of the receptacle 10 is a tubular connection 23, the top of which is approximately the height of the base plate 16 so that when water accumulates in the bottom of the receptacle 10 the pressure of the oil and water in the receptacle will force the water automatically from the bottom of the receptacle through the tubular member 22 and out through the tubular member 23. A sight-feed 24 is provided in connection with the tubular member 23 so that the character of the fluid discharged therethrough may be observed, and the top end of pipe 22 is left open to prevent siphoning. An overflow pipe 25 leads from the receptacle at a point above the filter 16.

Instead of supporting the filter elements 14 from the tubular member 12, the filter elements may be supported in brackets 26. The filter elements are shown in Figs. 3 and 4 supported by brackets attached to the walls of a rectangular receptacle 27, although, of course, the brackets may be as readily secured to a receptacle circular in cross section or any other desirable shape. This construction has the advantage that the weight of the filter elements is not imposed upon the tubular member 12 or upon the bottom of the receptacle 10.

In operation a mixture of water and oil is discharged into the separator receptacle 10 through the inlet tube 20, and when the liquid gets above the height of the base plate 16 the top of the liquid will be skimmed off and caused to pass downwardly through the pipe 12 and outwardly through the cocks 14ª to the filter bags 14. The water in the mixture which is delivered to the separator receptacle will, of course, pass to the bottom thereof and the separation will be assisted by the heat from the steam-coil 17ᵇ and will pass automatically out through the discharge overflow 22. The liquid which passes through the filter bags 14 collects in the bottom of the receptacle 5 from which it may be discharged or drawn in any desired manner, as for example, through the cock 8, or from the discharge opening 8ª.

What I claim is:

In a combined filter and separator, the combination with a receptacle open at the top having draw-off means adjacent the bottom and a door adjacent the top, of a separator receptacle adapted to be inserted in the open top with a ridge for holding it in position with respect thereto, an upright tubular member secured to the separator receptacle and extending through the bottom thereof, the lower end forming a support, a plurality of separate groups of interchangeable filter elements rotatably mounted on said support, stop-cocks in connection with the tubular member for discharging fluid therefrom into the filter elements, the said stop-cocks and filter elements being adjustable through the open door of the first named receptacle, a base plate secured to the tubular member at a point adjacent the top thereof, a filter screen extending upwardly from the edge of the base plate, a tubular inlet with a sight-feed extending through the top of the separator receptacle to a point adjacent the bottom, and an automatic water discharge comprising a tubular member extending from a point adjacent the top of the separator receptacle to a point adjacent the bottom and having a lateral outlet with its top substantially at the height of the bottom of the base plate.

In testimony whereof I have signed my name to this specification, in the presence of two subscribing witnesses, on this 28th day of February A. D. 1914.

WILLIAM WASHBURN NUGENT.

Witnesses:
KENT W. WONNELL,
ALLENA OFFUT.

Copies of this patent may be obtained for five cents each, by addressing the "Commissioner of Patents, Washington, D. C."